United States Patent
Hamaguchi

(10) Patent No.: US 9,983,834 B2
(45) Date of Patent: May 29, 2018

(54) INFORMATION PROCESSING APPARATUS, METHOD OF WRITING CONTIGUOUS BLOCKS FOR SECURE ERASE DATA AND WRITING DISTRIBUTIVE BLOCKS FOR NON-SECURE ERASE DATA

(71) Applicant: CANON KABUSHIKI KAISHA, Tokyo (JP)

(72) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 14/499,712

(22) Filed: Sep. 29, 2014

(65) Prior Publication Data
US 2015/0106550 A1    Apr. 16, 2015

(30) Foreign Application Priority Data

Oct. 11, 2013    (JP) .................................. 2013-214136

(51) Int. Cl.
*G06F 3/06* (2006.01)

(52) U.S. Cl.
CPC ............ *G06F 3/0688* (2013.01); *G06F 3/061* (2013.01); *G06F 3/0652* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,341,339 A * | 8/1994 | Wells | ............ | G06F 3/0601 365/185.09 |
| 7,913,032 B1 * | 3/2011 | Cornwell | ............ | G06F 12/0246 711/103 |
| 8,373,886 B2 | 2/2013 | Murakami et al. | | |
| 2006/0010160 A1 | 1/2006 | Kishi et al. | | |
| 2010/0118614 A1 * | 5/2010 | You | ............ | G11C 7/02 365/189.02 |
| 2012/0007952 A1 * | 1/2012 | Otsuka | ............ | H04N 5/9205 348/46 |
| 2012/0206466 A1 * | 8/2012 | Sharp | ............ | G06T 1/60 345/543 |
| 2014/0006898 A1 * | 1/2014 | Sharon | ............ | H03M 13/356 714/755 |

FOREIGN PATENT DOCUMENTS

| | | |
|---|---|---|
| JP | 2004-153516 A | 5/2004 |
| JP | 2006-023854 A | 1/2006 |

* cited by examiner

*Primary Examiner* — Ann J Lo
*Assistant Examiner* — Chie Yew
(74) *Attorney, Agent, or Firm* — Fitzpatrick, Cella, Harper & Scinto

(57) ABSTRACT

An information processing apparatus determines, when data is written to a semiconductor storage including a plurality of flash memories, whether or not the data to be written is specific data (data associated with the complete erasure) for which it is set that unnecessary data relating to the data is made to be erasable so that the unnecessary data does not remain in the semiconductor storage. In a case where it is determined that the data to be written is not the specific data, the information processing apparatus performs data write processing in a state where an interleave is enabled. Meanwhile, in a case where it is determined that the data to be written is the specific data, the information processing apparatus performs data write processing in a state where the interleave is disabled.

9 Claims, 7 Drawing Sheets

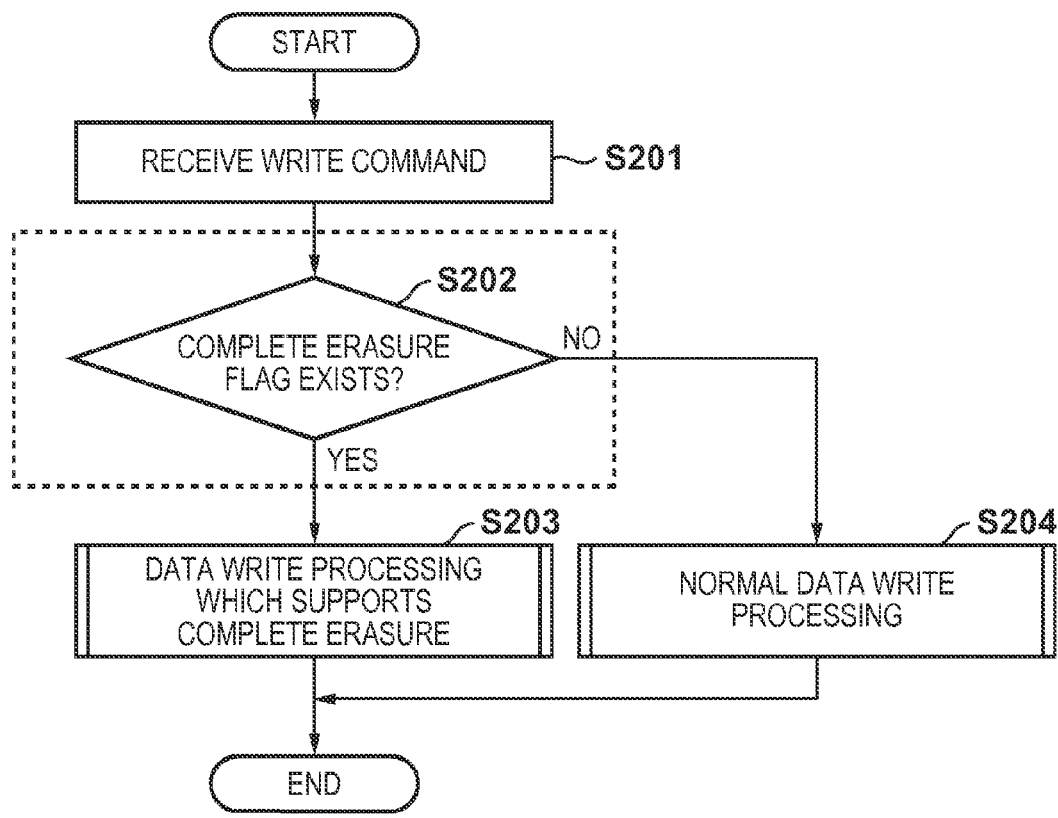
F I G. 6A

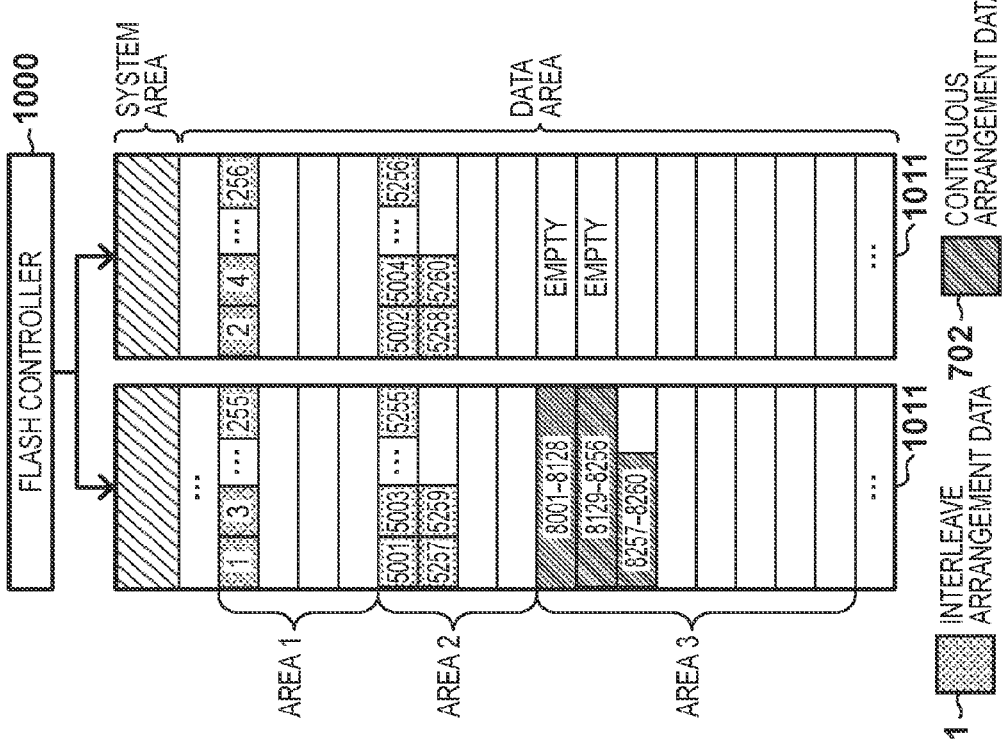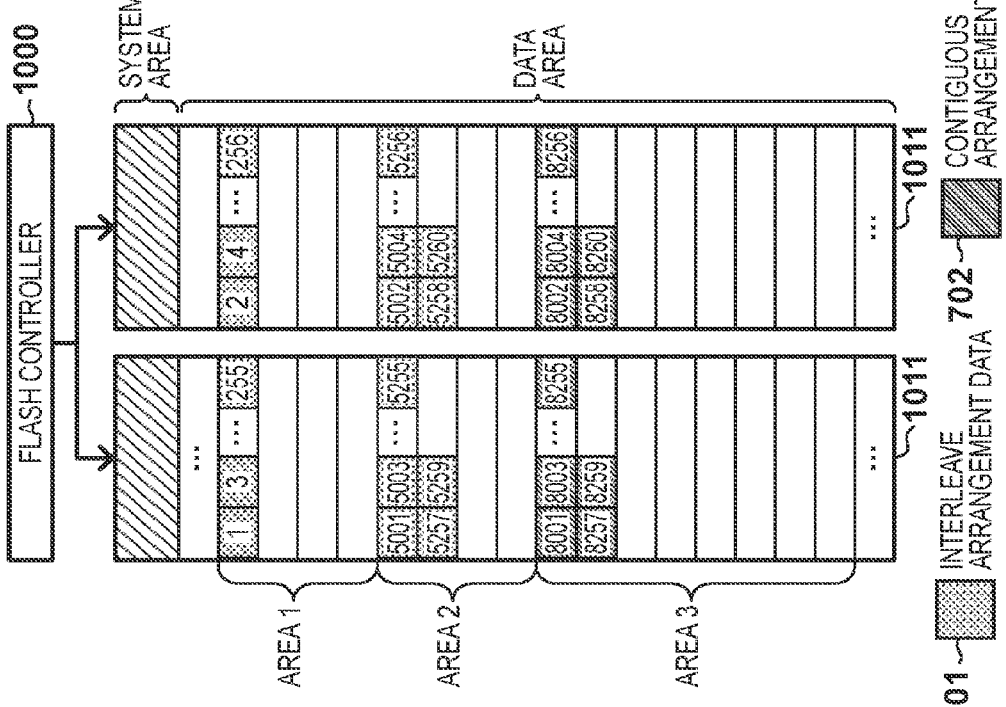

INFORMATION PROCESSING APPARATUS, METHOD OF WRITING CONTIGUOUS BLOCKS FOR SECURE EREASE DATA AND WRITING DISTRIBUTIVE BLOCKS FOR NON-SECURE ERASE DATA

BACKGROUND OF THE INVENTION

Field of the Invention

The present invention relates to an information processing apparatus on which a solid-state drive (SSD) is mounted, a method of controlling the same, and a storage medium.

Description of the Related Art

Generally, for image forming apparatuses, configuration is taken such that a hard disk drive (HDD) is mounted, and programs, image data, or the like, is stored in the HDD. Meanwhile, in recent years, increases in capacity and decreases in cost of solid-state drives (SSD) have advanced, and the spread of SSDs has advanced rapidly with a focus on mobile PCs. SSDs, compared to HDDs, have the advantages of not only being capable of high speed random access, but also having low consumption power, having high shock resistance, being light weight, and being space economical. In particular, initialization operation such as a spin up that is necessary in HDDs upon system activation is unnecessary with SSDs, and in addition to high speed data transfer, activation time of SSDs is significantly shortened. Furthermore, because SSDs do not have disk driving parts that are easily broken due to shock, SSDs are superior in not only shock resistance but also are superior in heat resistance. For these reasons, SSDs have been receiving attention as image forming apparatus storage devices.

However, there is an upper limit on the number of times that flash memories, which are the storage devices mounted in SSDs, are writable. For example, the number of times that an SLC (Single Level Cell) is writable is approximately one hundred thousand, and the number of times that an MLC (Multiple Level Cell) is writable is approximately ten thousand. Furthermore, due to process miniaturization of flash memories, the number of times that flash memories will be rewritable will have a tendency to decrease.

In order to deal with the restriction on the number of times that flash memory is writable, a flash memory controller mounted on an SSD distributes writing of data to data write destination areas by averaging so that a write frequency is not concentrated to a particular area in the flash memory. This technique is referred to as "wear leveling". Furthermore, a technique known as an "interleave" in which a flash memory controller distributes data write destination areas to a plurality of flash memories is used. With such a technique, it is possible to lengthen the life span of flash memory i.e. the storage device.

Meanwhile, in image forming apparatuses, demand for a security guarantee with respect to data such as image data, and demand for privacy protection is very high, and there is demand that spool data and saved data recorded in storage be completely erasable. Techniques for performing a complete erasure of data to be erased in an HDD by eliminating a residual magnetism by overwriting, with dummy data, an area in which data to be erased is recorded a plurality of times has been proposed (for example, refer to Japanese Patent Laid-Open No. 2004-153516, and Japanese Patent Laid-Open No. 2006-023854).

With SSDs, unlike HDDs, it is possible to completely erase in a single rewrite the data to be erased. However, with normal write processing, even if an erasure of data is executed by address designation, due to the above-mentioned wear leveling, direct rewriting of the data to be erased cannot be performed. For this reason, in order to erase completely the data to be erased in the SSD, it is necessary to perform special write processing which supports a complete erasure.

However, in flash memories mounted in SSDs, due to one of their characteristics, erasure of data can only be performed in predetermined block units. For this reason, there is a problem in that, in a case where complete erasure of data stored in an SSD is performed, system capabilities are severely reduced due to overhead upon data erasure. For example, in a case where the size of the data that became unnecessary is smaller than block size of the flash memory mounted on the SSD, it is necessary to perform deletion processing of a block to be erased after having evacuated the data stored in the block to be erased other than the data to be erased to another block. Also, in a case where data is arranged to be distributed over a number of blocks due to an interleave being performed for a plurality of chips or banks, it is necessary to individually perform erasing processing for each block in which the data is distributively arranged in order to erase the unnecessary data.

SUMMARY OF THE INVENTION

The present invention has been made in view of the above described issues. The present invention provides a technique in which, a deterioration of a system capability due to an erasure of unnecessary data is prevented when data is written to a semiconductor storage including a plurality of flash memories, by controlling an execution status of an interleave appropriately.

According to one aspect of the present invention, there is provided an information processing apparatus comprising: a semiconductor storage including a plurality of flash memories; a determination unit configured to determine, when data is written to the semiconductor storage, whether or not the data to be written is specific data for which it is set that unnecessary data relating to the data is made to be erasable so that the unnecessary data does not remain in the semiconductor storage; and a writing unit configured to write to the semiconductor storage the data to be written, in a state where an interleave, in which the data is written distributively into the plurality of flash memories, is enabled in a case where it is determined that the data to be written is not the specific data, and in a state where the interleave is disabled in a case where it is determined that the data to be written is not the specific data.

According to another aspect of the present invention, there is provided a method of controlling an information processing apparatus comprising a semiconductor storage including a plurality of flash memories, the method comprising: determining, when data is written to the semiconductor storage, whether or not the data to be written is specific data for which it is set that unnecessary data relating to the data is made to be erasable so that the unnecessary data does not remain in the semiconductor storage; and writing to the semiconductor storage the data to be written, in a state where an interleave, in which the data is written distributively into the plurality of flash memories, is enabled in a case where it is determined that the data to be written is not the specific data, and in a state where the interleave is disabled in a case where it is determined that the data to be written is not the specific data.

According to still another aspect of the present invention, there is provided a computer-readable storage medium storing a computer program for causing a computer to execute steps of a method of controlling an information processing apparatus comprising a semiconductor storage including a plurality of flash memories, the method comprising: determining, when data is written to the semiconductor storage, whether or not the data to be written is specific data for which it is set that unnecessary data relating to the data is made to be erasable so that the unnecessary data does not remain in the semiconductor storage; and writing to the semiconductor storage the data to be written, in a state where an interleave, in which the data is written distributively into the plurality of flash memories, is enabled in a case where it is determined that the data to be written is not the specific data, and in a state where the interleave is disabled in a case where it is determined that the data to be written is not the specific data.

Further features of the present invention will become apparent from the following description of exemplary embodiments (with reference to the attached drawings).

BRIEF DESCRIPTION OF THE DRAWINGS

FIGS. 6A to 6C are flowcharts showing a procedure for data write processing in the SSD 413.

FIGS. 7A and 7B are views for showing examples usage of storage areas in the SSD 413 by normal data write processing and data write processing which supports a complete erasure.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Configuration>

Figure 1:
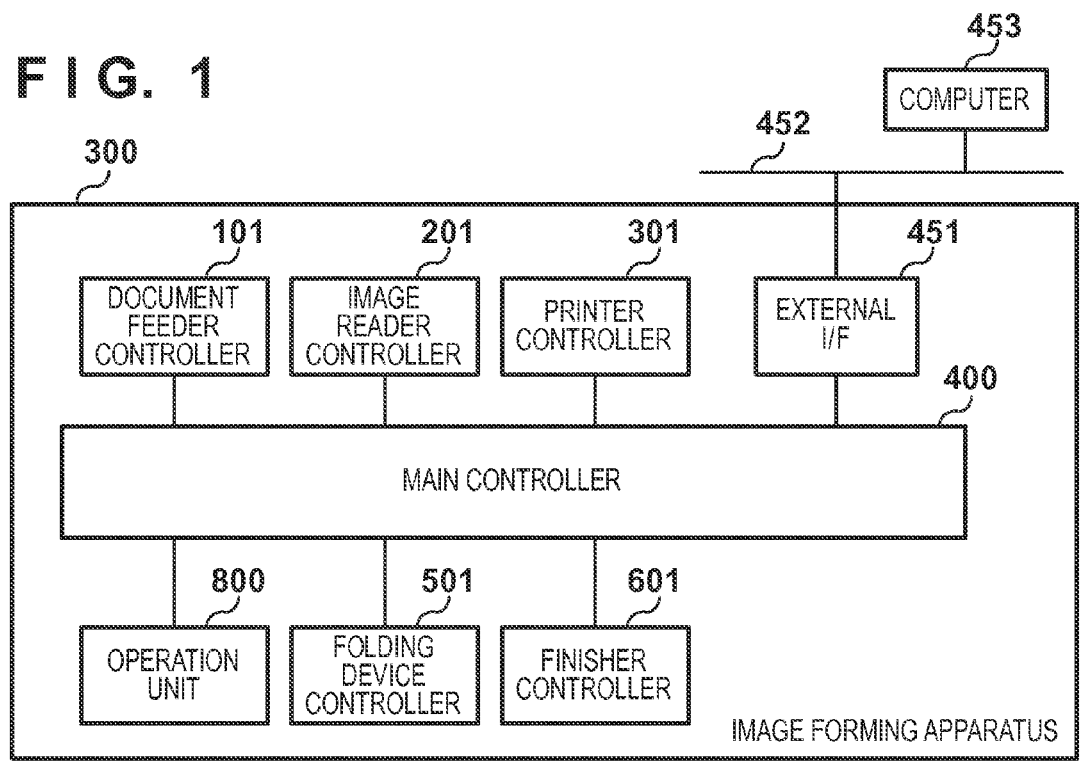
FIG. 1 is a block diagram for showing an example control configuration of an image forming apparatus 300.

FIG. 1 is a block diagram for showing an example control configuration of an image forming apparatus 300 according to embodiments of the present invention. In the embodiments below, explanation will be given for examples of the image forming apparatus 300 functioning as one example of an information processing apparatus of the present invention.

The image forming apparatus 300 is equipped with a main controller 400 that controls the image forming apparatus 300 on the whole. To the main controller 400, a document feeder controller 101, an image reader controller 201, a printer controller 301, a folding device controller 501, a finisher controller 601, an operation unit 800, and an external interface (I/F) 451 are connected.

The main controller 400 controls the document feeder controller 101 and the image reader controller 201 based on instructions provided from the operation unit 800 or an external computer 453. The document feeder controller 101 feeds documents to a read position for reading by an image reader (not shown) by controlling a document feeder (not shown). Also, the image reader controller 201 acquires image data by reading an image of a document with an image reader by controlling the image reader. The printer controller 301 performs image formation to a sheet by, for example, a electrophotographic process in accordance with image data by controlling a printer (not shown) under the control of the main controller 400.

The folding device controller 501 and the finisher controller 601 execute post-processing such as folding processing, stapling processing or hole-punch processing on a sheet by controlling a folding apparatus (not shown) and a finisher (not shown) respectively under the control of the main controller 400.

The external I/F 451 is an I/F to which the external computer 453 is connected. The main controller 400 is connected to an external bus 452 by the external I/F 451, and the external computer 453 is connected to the external bus 452. The external bus 452 is, for example, a network or USB.

The main controller 400 receives print data from the external computer 453 via the external I/F 451, and executes printing in accordance with the print data by controlling the printer controller 301. Also, the main controller 400 transmits image data recorded in a later explained storage device (an HDD 407 or an SSD 413 of FIG. 2) to the external computer 453 via the external I/F 451.

Figure 2:
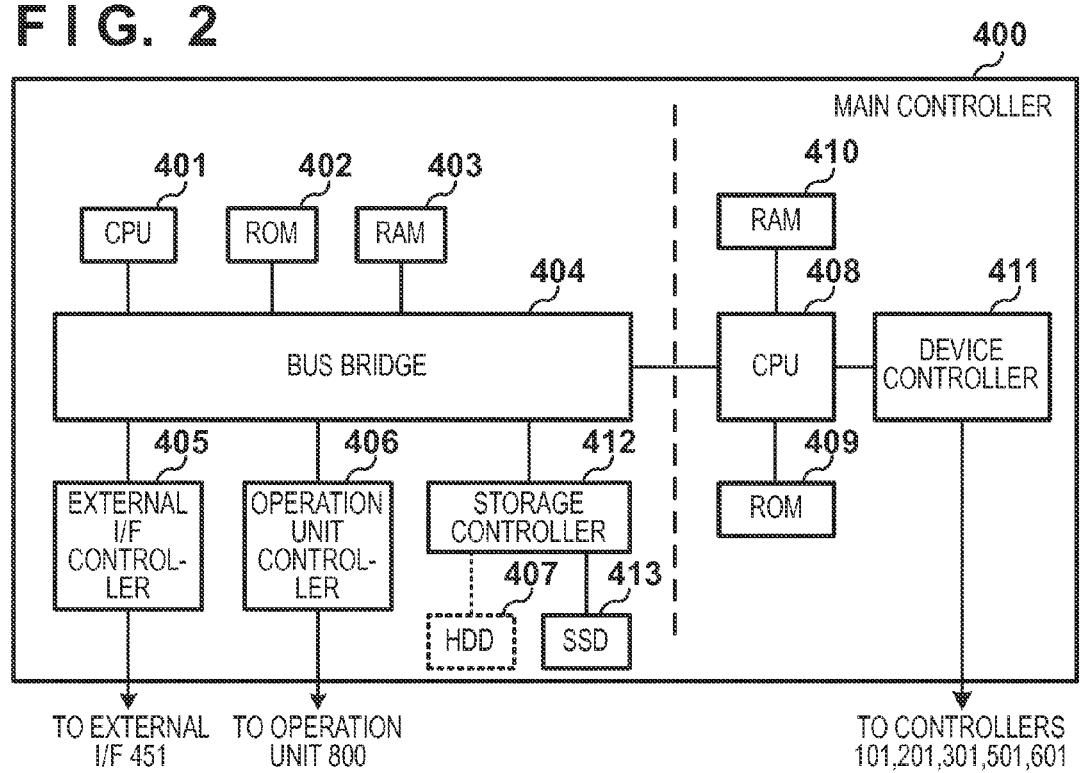
FIG. 2 is a block diagram for showing an example configuration of a main controller 400.

FIG. 2 is a block diagram for showing an example configuration of the main controller 400. The main controller 400 is equipped with two CPUs (a CPU 401 and a CPU 408), and an operating system (hereinafter referred to as the OS) operates under each CPU.

The CPU 401 is connected to a bus bridge 404. The CPU 401 performs communication with the CPU 408 via the bus bridge 404. To the bus bridge 404, a ROM 402, a RAM 403, an external I/F controller 405, an operation unit controller 406, and a storage controller 412 are connected. In the ROM 402, an initial activation program of the CPU 401 is stored. RAM 403 holds control data of the CPU 401 temporarily, and is used as a work area for arithmetic operations involved in control by the CPU 401.

The external I/F controller 405 is connected to the external I/F 451, and performs control of the external I/F 451. The operation unit controller 406 is connected to the operation unit 800 and performs control of the operation unit 800. The storage controller 412 is connected to the solid-state drive (SSD) 413 and the hard disk drive (HDD) 407 which are storage devices. However, because the HDD 407 is an optional storage device, it is possible that there are cases in which the HDD 407 does not exist. The storage controller 412 controls the SSD 413 and the HDD 407.

Figure 5:
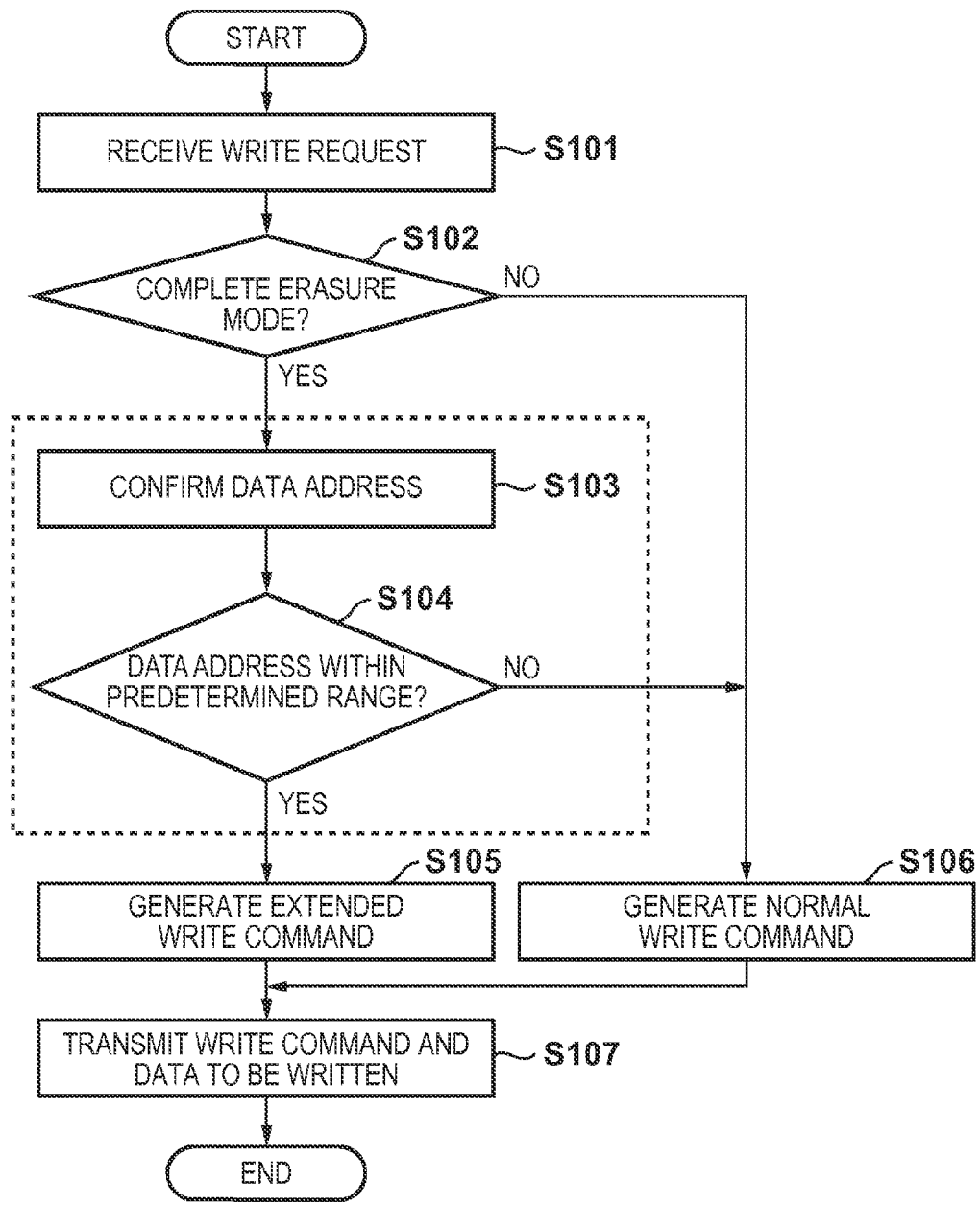
FIG. 5 is a flowchart showing a control procedure for controlling an interleave execution status performed upon data write processing for writing to an SSD 413.

In the SSD 413, for example, a main program including the OS that operates under the CPU 401 and the CPU 408 is stored. Note, in the main program, programs for realizing processing in accordance with the later explained FIG. 5 are included. In a case where the HDD 407 is not connected to the storage controller 412, image data acquired by the image reader and the external I/F 451, and image data edited in accordance with an operation for the operation unit 800 is stored in the SSD 413. Also, in a case where the HDD 407 is not connected to the storage controller 412, data such as application programs and user preference data is stored in the SSD 413. Note, in this embodiment, the SSD 413 is used as a flash disk.

Meanwhile, in a case where the HDD 407 is connected to the storage controller 412, image data acquired by the image reader and the external I/F 451, and image data edited in accordance with an operation for the operation unit 800 is stored in the HDD 407. Also, data such as application programs and user preference data is stored in the HDD 407. The CPU 401 and the CPU 408 are able to access the HDD 407 via the storage controller 412.

The CPU 408 is connected to the bus bridge 404, a ROM 409, a RAM 410, and a device controller 411. In the ROM 409, an initial activation program of the CPU 408 is stored. RAM 410 holds control data of the CPU 408 temporarily, and is used as a work area for arithmetic operations involved in control by the CPU 408. The device controller 411 is responsible for control of the document feeder controller 101, the image reader controller 201, the printer controller 301, the folding device controller 501, and the finisher controller 601.

Figure 3:
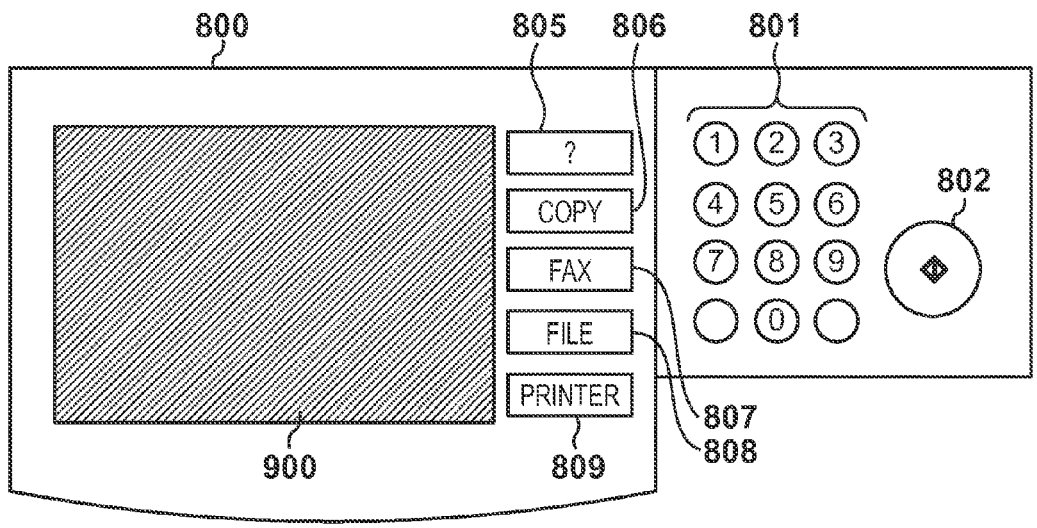
FIG. 3 is a view for illustrating an example configuration of an operation unit 800.

FIG. 3 a view for illustrating an example configuration of the operation unit 800 of the image forming apparatus 300. The operation unit 800 includes a liquid crystal display (LCD) 900 on the surface of which a touch panel sheet is affixed, a numeric keypad 801, a start key 802, a guide key 805, a copy mode key 806, a FAX key 807, a file key 808, and a printer key 809.

An operation screen is displayed on the LCD 900. When keys displayed on the operation screen are pressed by a user, position information indicating the position pressed on the touch panel is transferred from the operation unit 800 to the main controller 400. The main controller 400 executes control in accordance with the position information.

Also, a user is able to input a number of copies, for example, using the numeric keypad 801. When a user presses the start key 802 after setting desired conditions, the main controller 400 initiates a copy operation or a document read operation, for example. The guide key 805 is used for displaying an explanation relating to the functions of the keys on the LCD 900. The copy mode key 806 is used for performing copying. The FAX key 807 is used for performing setting related to FAX. The file key 808 is used for outputting file data. The printer key 809 is used for such things as setting when printing image data sent from an external apparatus such as the external computer 453.

Figure 4:
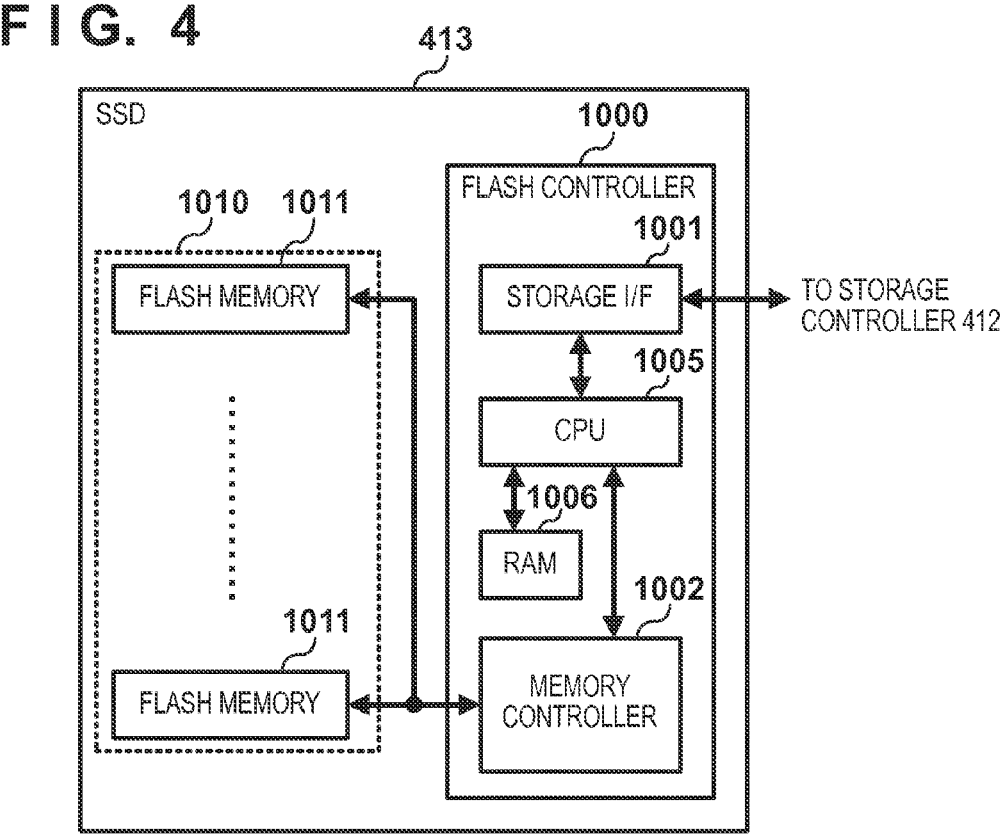
FIG. 4 is a block diagram for showing an example configuration of an SSD 413.

FIG. 4 is a block diagram for showing an example configuration of the SSD 413. As illustrated in FIG. 4, the SSD 413 is equipped with a flash controller 1000 and a semiconductor storage 1010, and the semiconductor storage 1010 includes a plurality of flash memories 1011. The flash controller 1000 is provided with a storage I/F 1001, a memory controller 1002, a CPU 1005, and a RAM 1006. The storage I/F 1001 is connected to the storage controller 412, and is a module for performing communication with the storage controller 412. In this embodiment, a serial ATA (SATA: Serial AT Attachment) I/F is used as the storage I/F 1001.

Each of the flash memories 1011 included in the semiconductor storage 1010 is connected to the memory controller 1002. The memory controller 1002 performs reading/writing of data from/to the flash memories 1011 based on a command received via the storage I/F 1001. The CPU 1005 controls the memory controller 1002 by loading into the RAM 1006, and executing, control firmware saved in one of the flash memories 1011. With this, the CPU 1005, as will be explained later, performs switching control for switching between write processing to the flash memories 1011 which is performed in a state in which an interleave is enabled, and write processing to the flash memories 1011 which is performed in a state in which the interleave is disabled.

The CPU 1005 and the memory controller 1002 have an interleave function for controlling the plurality of flash memories 1011 in parallel. A bank interleave and a chip interleave are known as interleave functions. In the bank interleave, a plurality of banks are arranged in the plurality of flash memories 1011, and the banks that are targets of a parallel read/write are switched by a chip select signal while a data bus and a chip address are shared. Meanwhile, in a chip interleave, for a plurality of flash chips, chips that are targets of a parallel read/write are switched by a chip select signal. In general, according to these interleave functions, the higher the level of parallelism of the banks or chips that are targets of the interleave, the faster reading/writing can be performed superficially.

<Interleave Execution Status Control>

The image forming apparatus 300 according to the embodiment has a function for performing a "complete erasure" for data stored in the SSD 413. "complete erasure" corresponds to an operation for erasing, when erasure of data is performed after writing of the data to the semiconductor storage 1010 (the SSD 413), unnecessary data relating to the data such that it does not remain in the semiconductor storage 1010 (the SSD 413). For example, in a case where a complete erasure of data stored in the SSD 413 is performed, the image forming apparatus 300 inhibits reading out of data from blocks in the SSD 413 in which data that became unnecessary is stored, and erases the data in the blocks at an appropriate time afterwards. In this way, in addition to preventing the data being read out from a block with an address designation after erasing processing, reliably erasing the data in the block without allowing the data to remain in the SSD 413 is realized.

However, in a case where such a complete erasure is performed, as described above, there is the possibility that system capabilities in the image forming apparatus 300 will deteriorate severely due to additional processing necessary when the unnecessary data is erased. So, the image forming apparatus 300 according to the embodiment controls appropriately the execution status of the interleave, in which, when data is written to the SSD 413 (semiconductor storage 1010), the data is written distributively to the plurality of flash memories 1011. With this, preventing a deterioration of system capabilities due to the erasure of the unnecessary data is made possible.

More specifically, the image forming apparatus 300 (CPU 1005) controls the execution status of the interleave in accordance with whether or not the data to be written to the semiconductor storage 1010 is data associated with the complete erasure. Here, the data associated with the complete erasure corresponds to data (specific data) for which it is set that the data is erasable in such a way that unnecessary data relating to the data does not remain in the semiconductor storage 1010. When the data is to be written to the semiconductor storage 1010, the image forming apparatus 300 determines whether or not the data to be written is data associated with the complete erasure. Furthermore, in a case where the image forming apparatus 300 determines that data to be written is not data associated with the complete erasure, the image forming apparatus 300 performs (normal) data write processing in a state in which the interleave is enabled. Meanwhile, in a case where the image forming apparatus 300 (the CPU 1005) determines that the data to be written is data associated with the complete erasure, the image forming apparatus 300 performs data write processing in a state in which the interleave is disabled.

In this way, in a case where data associated with the complete erasure is written to the SSD 413, the interleave is not executed, and the data is not stored distributively in the plurality of flash memories 1011. For this reason, additional processing as described above is not necessary upon unnecessary data erasure, and it is possible to prevent a deterioration of system capabilities due to the erasure of the unnecessary data. Meanwhile, in a case where data that is not associated with the complete erasure is written to the SSD 413, high speed write processing can be realized because normal write processing is executed in a state in which the interleave is enabled.

In a case where the state is such that the interleave is disabled, the image forming apparatus 300 may write the data to be written to, for example, a contiguous storage area (block) in any of the flash memories rather than writing distributively to the plurality of flash memories 1011. Unnecessary data is thus enabled to be collectively erased from a single flash memory, which realizes efficiently the complete erasure of data.

Below, specific explanation will be given for an embodiment for realizing processing as described above with reference to FIGS. 5 to 7B.

FIG. 5 is a flowchart showing a control procedure, for controlling an interleave execution status, which is executed by the CPU 401 of the main controller 400 when the data write processing for writing to the SSD 413 is performed. The processing of the steps shown in the flowchart of FIG. 5 is realized by the CPU 401 loading into the RAM 403 and executing a program stored in the SSD 413 or the HDD 407.

When, in step S101, the CPU 401 receives a data write request for writing to the SSD 413 from the OS which is in operation under the CPU 401, the CPU 401 determines whether or not the image forming apparatus 300 is set to be in the complete erasure mode (a predetermined operation mode) in step S102. Here, the complete erasure mode corresponds to an operation mode in which a complete erasure is enabled for data after writing the data to the SSD 413 (semiconductor storage 1010). In other words, the complete erasure mode corresponds to an operation mode for performing an operation that makes unnecessary data relating to the data written to the SSD 413 be erasable so that the unnecessary data does not remain in the SSD 413.

In step S102, the CPU 401 advances the processing to step S103 in a case where it is determined that the image forming apparatus 300 is set to be in the complete erasure mode. Meanwhile, the CPU 401 advances the processing to step S106 in a case where it is determined that the image forming apparatus 300 is not set to be in the complete erasure mode.

In step S103, the CPU 401 confirms a data address of the data to be written to the SSD 413. Here, the data address is an address compliant with LBA (Logical Block Addressing), which is used for specifying the data arranged within the SSD 413, in the main controller 400 as will be explained later using FIGS. 7A and 7B. In step S104, the CPU 401 determines whether or not the data address designated for the data to be written is an address within a predetermined range. The CPU 401 advances the processing to step S105 in a case where the data address designated for the data to be written is an address within the predetermined range, and advances the processing to step S106 in a case where the data address designated for the data to be written is not an address within the predetermined range.

In this embodiment, the predetermined range of data addresses used in step S104 corresponds to a particular partition (predetermined storage area) arranged in advance for secure data (specific data) arrangement in each of the flash memories 1011 of the SSD 413. In this embodiment, in a case where data write processing is performed for the particular partition, the interleave is disabled, and in a case where data write processing is performed for another partition, the interleave is enabled. Accordingly, in step S104, the processing is advanced to step S105 or to step S106 in accordance with whether or not the particular partition of any of the flash memories is designated as an arrangement destination for the data to be written.

In step S106, the CPU 401 generates a normal write command. Meanwhile, in step S105, the CPU 401 generates an extended write command by setting, in a normal write command, a complete erasure flag which indicates that the data to be written is data associated with the complete erasure (specific data). Note a feature register may be used, in an SATA or ATA standard storage interface, as an area in which the complete erasure flag is set for distinguishing the extended write command from the normal write command.

After step S105 or step S106, the CPU 401, in step S107, transmits the generated write command (normal write command or extended write command) and data to be written to the SSD 413, to the SSD 413 via the storage controller 412. In this way, the CPU 401 executes the data write to the SSD 413.

Note, for the processing of step S103 and step S104, which is surrounded by a broken line shown in FIG. 5, alternative processing may be executed in step S202 which will be explained later. In such a case, the CPU 401, regardless of the result of the determination in step S102, advances the processing to step S106, generates a normal write command, and transmits the command to the SSD 413.

Figure 6B:
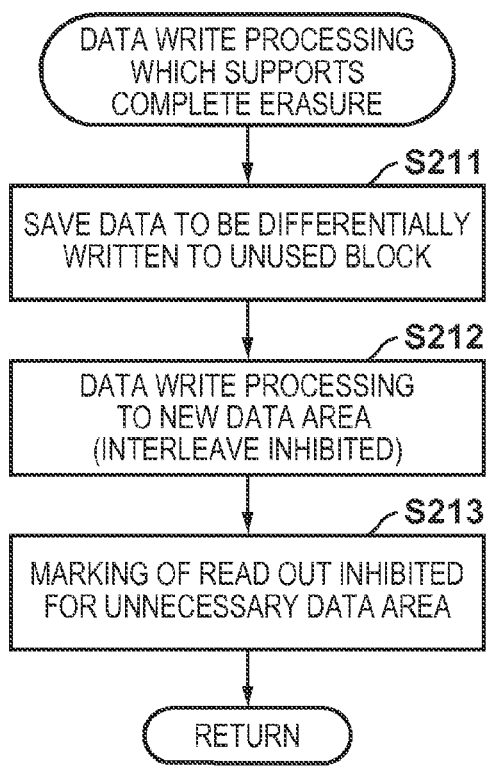
Figure 6C:
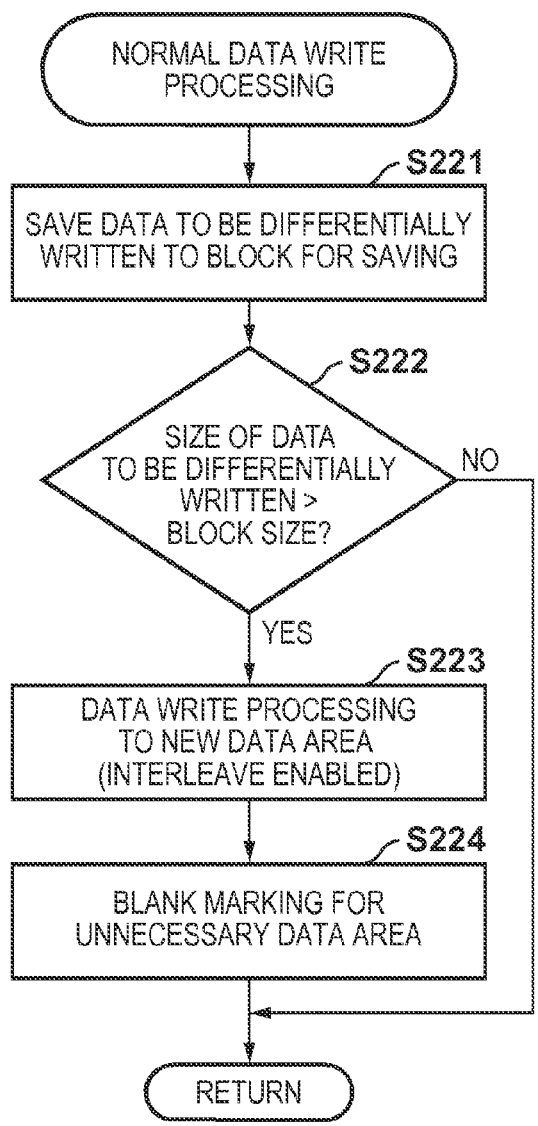

FIGS. 6A to 6C are flowcharts showing a procedure for data write processing in the SSD 413. The processing of the steps shown in the flowcharts of FIGS. 6A to 6C is realized by the CPU 1005 of the SSD 413 loading into the RAM 1006 and executing a program stored in one of the flash memories 1011.

First, as shown in FIG. 6A, when a write command is transmitted to the SSD 413 from the storage controller 412, the CPU 1005, in step S201, receives the write command via the storage I/F 1001 in the flash controller 1000. Next, in step S202, the CPU 1005 determines whether or not the complete erasure flag exists in the received data write command, and advances the processing to step S203 in a case where it determines that the complete erasure flag does exist, and advances the processing to step S204 in a case where it determines that the complete erasure flag does not exist. In other words, the CPU 1005 advances the processing to step S203 in a case where the data to be written is data associated with the complete erasure (specific data), and advances the processing to step S204 in a case where the data to be written is not data associated with the complete erasure.

In step S203, the CPU 1005 performs writing of the data to the flash memories 1011 by data write processing which supports the complete erasure and is performed in a state where the interleave is disabled, in accordance with the procedure shown in FIG. 6B. Meanwhile, in step S204, the CPU 1005 performs writing of data to the flash memories 1011 by normal data write processing which is performed in a state where the interleave is enabled, in accordance with the procedure shown in FIG. 6C. After step S203 or step S204, the CPU 1005 ends writing the data.

In this way, the CPU 1005 writes the data to be written to the semiconductor storage 1010 (the flash memories 1011), in a state where the interleave is either disabled or enabled in accordance with the write command corresponding to the result of the determinations in step S102 and step S104. Note, in a case where the processing of step S103 and step S104 is not executed as described above, the alternative processing is executed in step S202. In such a case, the CPU 1005, in step S202, may execute determination processing based on the data address of the data to be written included in the write command rather than determining whether or not the complete erasure flag exists in the write command, similarly to step S104.

Also, an interleave inhibit flag that indicates whether or not the interleave is inhibited (disabled) may be set in place of the above described complete erasure flag in the write command transmitted from the CPU 401 to the SSD 413. In such a case, the CPU 401, in step S202, may determine whether or not the interleave inhibit flag exists in the received data write command, and advance the processing to step S203 in a case where it determines that that the interleave inhibit flag exists, and advance the processing to step S204 in a case where it is determined that the interleave inhibit flag does not exist.

(Processing of Step S203)

The write processing which supports the complete erasure is executed in accordance with the procedure shown in FIG. 6B. Firstly, in step S211, the CPU 1005 stores data to be differentially written, which exists in a block to be re-written within a storage area of the flash memories 1011, in an unused block temporarily.

Next, in step S212, the CPU 1005 performs writing to a new block for data that is not updated in the block to be re-written, and for data to be differentially written in the block to be re-written. In a case of the data write processing which supports the complete erasure, when data is written to the SSD 413, the interleave is not executed. For this reason, in the write processing in step S212, the data is written in a contiguous area in any of the plurality of flash memories 1011 (chip or bank), such that the data to be written is in a state where it is arranged contiguously.

Finally, the CPU 1005, in step S213, performs a marking indicating that reading out is inhibited for the blocks in which unnecessary data exists, i.e., the block prior to the rewriting, and the block in which the data to be differentially written has been temporarily saved. With this, the CPU 1005 inhibits reading out of data from these blocks. As a consequence, even if reading out of data is performed with an address designation for these blocks, only dummy data can be read out. With the above, the data write processing which supports the complete erasure ends.

(Processing of Step S204)

The normal data write processing is executed in accordance with the procedure shown in FIG. 6C. Firstly, the CPU 1005, in step S221, saves (adds) data to be differentially written, that exists in the block to be re-written within the storage area of the SSD 413 (the flash memories 1011), into a block for saving difference data.

Next, the CPU 1005, in step S222, determines whether or not the size of the data to be differentially written exceeds a block size, and in a case where the size of the data to be differentially written does not exceed the block size, the normal data write processing ends, and in a case where the size of the data to be differentially written does exceed the block size, the CPU 1005 advances the processing to step S223.

In step S223, the CPU 1005 performs writing to a new block for the data that is not updated in the block to be rewritten, the data to be differentially written, and the data of the portion that exceeds the block size. In a case of the normal data write processing, the interleave is executed when the data is written. For this reason, in the write processing in step S223, the data to be written is written simultaneously to a plurality of chips or banks so as to be in a state where the data to be written is arranged distributively.

Finally, the CPU 1005, in step S224, performs a marking indicating that a block is blank for the blocks in which unnecessary data exists, i.e., the block prior to rewriting, and the block in which the data to be differentially written has been temporarily saved. With this, the CPU 1005 enables these blocks to be used for other purposes by setting to an unused state. With the above, the normal data write processing ends.

FIGS. 7A and 7B are views for showing examples of usage of the storage area within the SSD 413 (the semiconductor storage 1010) by the normal data write processing and the data write processing which supports the complete erasure. FIG. 7A indicates a case where the normal data write processing is performed, and FIG. 7B indicates a case where the data write processing which supports the complete erasure is performed.

In FIGS. 7A and 7B show cases in which two flash memories 1011 are used in the SSD 413, and each line of each flash memory 1011 represents an area in which one block of data is storable. In a system area within the flash memories 1011, a program read out into the RAM 1006 and executed by the CPU 1005 is stored. Also, in a data area within the flash memories 1011, data used by the CPU 401 and the CPU 408 is stored. The pieces of data stored in the data areas shown in FIGS. 7A and 7B are given differing values, and these values correspond to addresses compliant with LBA, which are used for specifying a piece of data in the main controller 400.

In FIGS. 7A and 7B, the data area of each of the flash memories 1011 is divided into three areas (partitions) (areas 1, 2 and 3). In the areas 1 and 2, data 701 which is a target of an interleave arrangement is stored, i.e. data is stored in a state where the interleave is enabled. For this reason, in the areas 1 and 2, odd LBA data and even LBA data is respectively stored in physically differing blocks. The data corresponding to LBA addresses 1-5000 and the data corresponding to LBA addresses 5001-8000 is stored in the areas 1 and 2 respectively.

Meanwhile, the area 3 corresponds to a partition for storing secure data (specific data) in which data 702, which is a target of contiguous arrangement, is arranged. The data 702, which is a target of the contiguous arrangement, is stored in the area 3. In a state where the interleave is disabled, as illustrated in FIG. 7B, data whose LBA addresses are consecutive is stored so as to be arranged contiguously in the area 3. Meanwhile, in the state where the interleave is enabled, data whose LBA addresses are consecutive is stored distributively in the two flash memories 1011 even in the area 3, as shown in FIG. 7A.

In this way, for each of the areas in the flash memories 1011, it may be set in advance whether or not to make the interleave disabled (inhibit). In other words, in a case where the image forming apparatus 300 is set to be in the complete erasure mode, an area (the area 3) in which data whose LBA addresses are consecutive is arranged contiguously may be predetermined. In such a case, the interleave may be always set to be enabled for an area (the areas 1 and 2) other than such predetermined area. Such settings may be performed in advance on the flash controller 1000.

By virtue of the present embodiment, it becomes possible to reliably perform an erasure of data collectively, while avoiding a deterioration of system capabilities, for an area in which data associated with the complete erasure is stored. Meanwhile, for an area in which normal data, that is not associated with the complete erasure, is stored, high speed data write processing can be realized by performing the interleave. In other words, because the execution status of the interleave can be controlled appropriately when the data is written to the SSD 413 (the semiconductor storage 1010), it is possible to realize a high speed data writing while avoiding a deterioration of system capabilities due to an erasure of unnecessary data.

<Control Upon Shut Down of the Image Forming Apparatus>

Figure 8:
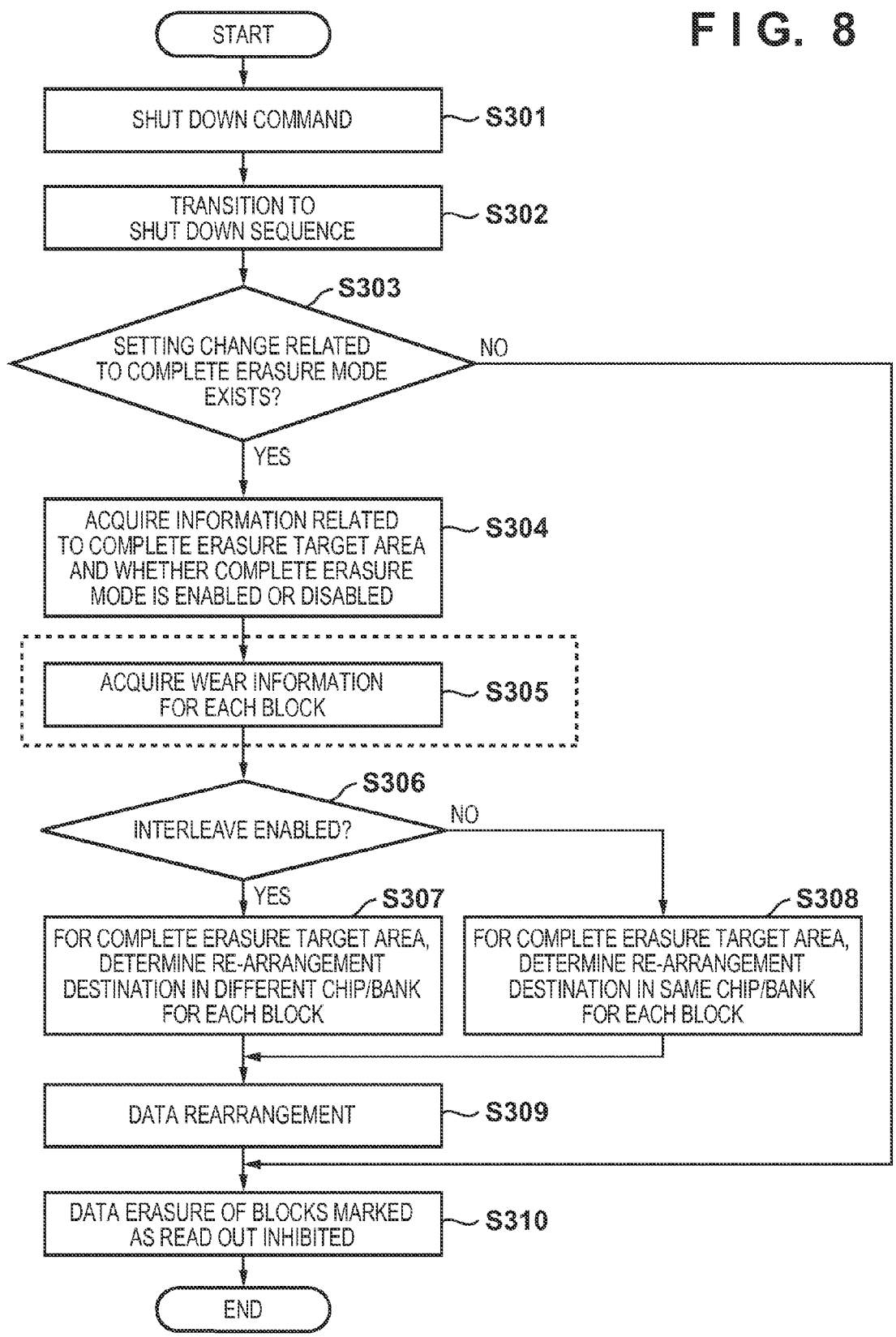
FIG. 8 is a flowchart showing a procedure for data rearrangement and unnecessary data erasure in the SSD 413, which is performed when the image forming apparatus 300 shuts down.

FIG. 8 is a flowchart showing a procedure for data rearrangement and unnecessary data erasure in the SSD 413, which is performed when the image forming apparatus 300 shuts down. The processing of the steps shown in the flowchart of FIG. 8 is realized by the CPU 1005 of the SSD 413 loading into the RAM 1006 and executing a program stored in one of the flash memories 1011.

When the CPU 1005 of the SSD 413, in step S301, receives a shut down command from the CPU 401 (in other words, shut down is instructed), the CPU 1005, in step S302, transitions to a shut down sequence. Next, the CPU 1005, in step S303, determines whether or not setting relating to the complete erasure mode in the image forming apparatus 300 is changed. In other words, the CPU 1005 determines whether or not to change the interleave execution status to a status differing from that before the shut down upon the next system activation. In a case where the CPU 1005, in step S303, determines that setting relating to the complete erasure mode is changed, the processing advances to step S304, and in a case where the CPU 1005 determines that such a setting is not changed, the processing advances to step S309.

In step S304, the CPU 1005 acquires information relating to a complete erasure target area within the flash memories 1011 (a range of data addresses that are targets of the complete erasure), and information indicating whether or not the complete erasure mode is enabled. The CPU 1005 stores the acquired information in the system area of the flash memories 1011. Next, in step S305, the CPU 1005 acquires wear information indicating a wear level for each block, for the purpose of rearrangement of data stored in each block within the flash memories 1011.

After this, the CPU 1005, in step S306, reads out information stored in the system area of the flash memories 1011, and determines whether or not the information indicates a setting for changing the interleave execution status from a disabled status to an enabled status upon the next activation. Here, in a case where the CPU 1005 determines that the information indicates the setting for setting the interleave enabled status upon the next activation, the processing advances to step S307. Meanwhile, in a case where the CPU 1005 determines that the information indicates the setting for changing the interleave execution status from the enabled status to the disabled status upon the next activation, the processing is advanced to step S308.

In steps S307 to S309, the CPU 1005 rearranges, in the plurality of flash memories 1011, the data arranged in the plurality of flash memories 1011 prior to the shutting down of the image forming apparatus 300, in accordance with the interleave execution status after the change.

Specifically, in step S307, for a complete erasure target area (the area 3 in FIG. 7A and FIG. 7B) within the flash memories 1011, the CPU 1005 determines which free block of a differing chip or bank the data stored in the respective block is to be rearranged in. In other words, the CPU 1005 causes the data to be rearranged in free areas distributed in the plurality of flash memories 1011, by determining blocks in a differing chip or bank to be rearrangement destinations for the data for each block.

Meanwhile, in step S308, for the complete erasure target areas in the flash memories 1011 (the area 3 in FIG. 7A and FIG. 7B), the CPU 1005 determines the data rearrangement destination blocks so as to cancel the interleave which has been enabled. Specifically, the CPU 1005 determines blocks to be the rearrangement destinations for the data of each block so that the data is stored in contiguous blocks from amongst free blocks within the same chip or bank for the complete erasure target area. With this, configuration is such that the data is rearranged in free areas that are contiguous in any of the plurality of flash memories 1011.

After this, in step S309, the CPU 1005 performs, for blocks prior to updating and for differential blocks in the updating, rearrangement (writing) of data to the rearrangement destination blocks within the flash memories 1011 determined in step S307 or step S308. When the writing of the data completes, the CPU 1005 advances the processing to step S310. In step S310, the CPU 1005 erases collectively, prior to the shutting down of the image forming apparatus 300, unnecessary data remaining in the plurality of flash memories 1011 after rearrangement of the data and stored in blocks for which the marking of read out inhibited exists. When the erasure of the data is completed, the CPU 1005 completes the processing.

The CPU 1005, in a case where the processing proceeds to step S309 from step S303, erases collectively the unnecessary data stored in the blocks for which the marking of read out inhibited exists, and completes the processing.

Note, it is not necessarily required that the processing of step S305 indicated by a broken line in FIG. 8 be executed. In a case where the CPU 1005 does not execute the processing of step S305 (in other words, does not acquire the wear information for each block), the rearrangement destination may be determined to be simply a free block without considering the wear information for each block in step S307 and step S308. Meanwhile, in a case where the CPU 1005 acquires the wear information for each block, the rearrangement destination blocks are determined such that a block having a lowest wear level out of the differing chips/banks be used preferentially in step S307. Also, in step S308, the CPU 1005 determines the rearrangement destination blocks so that a chip/bank in which more blocks with a low wear level are included is used preferentially.

In this way, with the processing shown in FIG. 8, data arrangement within the flash memories 1011 after the next system activation can be performed in accordance with the interleave execution status. With this, it becomes possible to avoid a deterioration of system capabilities due to an erasure of unnecessary data after a system activation. Also, a situation in which only a particular block is severely worn is enabled to be avoided by performing rearrangement of data based on the wear level of the blocks in the flash memories 1011.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-214136, filed Oct. 11, 2013, which is hereby incorporated by reference herein in its entirety.

What is claimed is:

1. An information processing apparatus comprising:
 a semiconductor storage including a plurality of flash memories;
 a determination unit configured to determine whether write data is written utilizing a write command having an indicator, wherein the indicator indicates that the write data is to be securely erased to prevent the write data from remaining in the semiconductor storage; and
 a writing unit configured to write the write data to the semiconductor storage with an interleave for writing distributively into the plurality of flash memories in a case where it is determined that the indicator is disabled, and to write the write data to a contiguous storage area in any of the plurality of flash memories in a case where it is determined that the indicator is enabled.

2. The information processing apparatus according to claim 1, wherein
 the determination unit determines, in a case where the information processing apparatus is set to a predetermined operation mode, that the write data is written utilizing the write command having the indicator enabled, and determines, in a case where the information processing apparatus is not set to the predetermined operation mode, that the write data is written utilizing the write command having the indicator disabled; and
 the predetermined operation mode is an operation mode for performing an operation that makes the write data erasable after writing of the write data to the semiconductor storage so that the data does not remain in the semiconductor storage.

3. The information processing apparatus according to claim 1, wherein
 the determination unit determines, in a case where a predetermined storage area of the plurality of flash memories included in the semiconductor storage is designated as an arrangement destination of the write data, the write data is written contiguously in the predetermined storage area, and determines, in a case where the predetermined storage area is not designated as the arrangement destination, the write data is written with the interleave in the predetermined storage area.

4. The information processing apparatus according to claim 3, wherein
 the determination unit determines, in a case where an address designated for the write data to be written is within a predetermined address range of the predetermined storage area, the write data is written utilizing the write command having the indicator enabled, and determines, in a case where the address designated for the write data to be written is not within the predetermined address range of the predetermined storage area, the write data is written utilizing the write command having the indicator disabled.

5. A method of controlling an information processing apparatus comprising a semiconductor storage including a plurality of flash memories, the method comprising:
 determining, whether write data is written utilizing a write command having an indicator, wherein the indicator indicates that the write data is to be securely erased to prevent the write data from remaining in the semiconductor storage; and
 writing the write data to the semiconductor storage with an interleave for writing distributively into the plurality of flash memories in a case where it is determined that the indicator is disabled, and writing the write data to a contiguous storage area in any of the plurality of flash storage memories in a case where it is determined that the indicator is enabled.

6. A non-transitory computer-readable storage medium storing a computer program for causing a computer to execute steps of a method of controlling an information processing apparatus comprising a semiconductor storage including a plurality of flash memories, the method comprising:
 determining whether write data is written utilizing a write command having an indicator, wherein the indicator indicates that the write data is to be securely erased to prevent the write data from remaining in the semiconductor storage; and
 writing the write data to the semiconductor storage with an interleave for writing distributively into the plurality of flash memories, in a case where it is determined that the indicator is disabled, and writing the write data to a contiguous storage area in any of the plurality of flash memories the in a case where it is determined that the indicator is enabled.

7. The information processing apparatus according to claim 1, further comprising:
 a rearrangement unit configured to rearrange, in a case where shutting down of the information processing apparatus is instructed, and an interleave indicator is changed to a new status upon a next activation of the information processing apparatus, wherein the new status is different from a current status of the interleave indicator before the shutting down, prior to the shutting down, plurality of data are arranged in the plurality of flash memories in accordance with the new status of the interleave indicator;

wherein the interleave indicator is distinct from the indicator; and an erasing unit configured to erase collectively, prior to the shutting down, unnecessary data remaining in the plurality of flash memories after the rearrangement by the rearrangement unit.

8. The information processing apparatus according to claim 7, wherein the rearrangement unit:

in a case where the interleave indicator is changed from a disabled status to an enabled status upon the next activation of the information processing apparatus, prior to the shutting down, the plurality of data in a contiguous storage area in any of the plurality of flash memories are rearranged into free areas distributed in the plurality of flash memories; and in a case where the the interleave indicator is changed from the enabled status to the disabled status upon the next activation of the information processing apparatus, prior to the shutting down, the plurality of data stored distributively in the plurality of flash memories are rearranged into a contiguous free area in any of the plurality of flash memories.

9. The information processing apparatus according to claim 8, further comprising an acquisition unit configured to acquire wear information indicating a wear level of each block in a storage area of the plurality of flash memories, wherein the rearrangement unit rearranges data giving preference to a free area within a free block in the storage area for which the wear level of the free block is low.

* * * * *